United States Patent [19]

Nelson

[11] Patent Number: 4,622,857
[45] Date of Patent: Nov. 18, 1986

[54] PRESSURE GAUGE AND REGULATOR

[75] Inventor: Donald D. Nelson, Springfield, Minn.

[73] Assignee: Sanborn Manufacturing Company, Inc., Springfield, Minn.

[21] Appl. No.: 661,370

[22] Filed: Oct. 16, 1984

[51] Int. Cl.⁴ .............................................. G01L 7/16
[52] U.S. Cl. ...................................... 73/744; 73/714; 116/34 R; 137/116.5; 137/557
[58] Field of Search ............. 73/744, 714; 137/116.5, 137/557, 227, 228, 229, 225, 226; 116/34 R

[56] References Cited

U.S. PATENT DOCUMENTS

| | | | |
|---|---|---|---|
| 1,086,296 | 2/1914 | Howe | 137/227 |
| 1,176,338 | 3/1916 | Bromberg | 73/744 |
| 1,220,272 | 3/1917 | Pollock | 73/744 |
| 3,286,726 | 11/1966 | Guy | 137/505.18 |
| 3,288,165 | 11/1966 | Cranage | 137/505.13 |
| 3,656,497 | 4/1972 | Brown | 137/116.5 |
| 3,948,045 | 4/1976 | Budinski et al. | 137/627.5 |
| 3,955,590 | 5/1976 | Palm et al. | 137/505.42 |

Primary Examiner—Donald O. Woodiel
Attorney, Agent, or Firm—Gregory P. Kaihoi; James R. Haller

[57] ABSTRACT

A pressure gauge and regulator for use in dispensing compressed air and similar gases from pressurized vessels. The device includes a linear pressure gauge having a spring loaded plunger slidingly carried within a cylinder. The plunger has an O-ring to seal against the cylinder wall, and a spring with a spring constant linearly relating longitudinal movement of the plunger to gas pressure against the plunger. A viewing port in the cylinder wall allows viewing of the position of the plunger and corresponding gas pressure. A hole in the cylinder wall may be provided to allow excess pressure to escape when the plunger seal is depressed past this hole. The device also includes a ball and seat valve for selectively releasing compressed gas from the inlet to the outlet. A piston movable in response to gas pressure at the outlet controls the valve, and a compression spring is provided for selectively urging the piston against this gas pressure. The piston includes a vent normally sealed to the ball but disengageable therefrom so that when gas pressure exceeds the spring pressure, the piston and vent move away from the ball, breaking this seal and allowing gas to escape until spring pressure again exceeds gas pressure.

15 Claims, 8 Drawing Figures

PRESSURE GAUGE AND REGULATOR

TECHNICAL FIELD

This invention relates to an improved pressure gauge and regulator for use with pressurized gases and the like.

BACKGROUND ART

In dispensing fluids such as pressurized gas from pressurized vessels, a number of mechanical devices are frequently employed to facilitate controlled and safe operation of the system. Typically these mechanical devices include a regulating mechanism to allow control over the pressure at which the fluid is dispensed, an over-pressure relief device to maintain safety of operation, and usually two pressure gauges, one gauge indicating the pressure within the pressure vessel and the second gauge indicating pressure on the other side of the regulating valve, i.e., line pressure. Previous apparatuses for performing these various tasks have often involved complex mechanical configurations, bulky appendages, and fragile parts.

DISCLOSURE OF THE INVENTION

The invention relates to a pressure gauge and flow regulator for attachment to pressurized vessels and the like. The pressure gauge is characterized by having a housing with an inner wall defining a bore, a plunger slideably received in the bore and sealingly engaging walls of the bore, inlet port means for supplying a fluid under pressure to a first end of the bore, and spring means carried within the bore and biasing the plunger toward said first end thereof, the spring means having a spring constant linearly relating longitudinal movement of the plunger to fluid pressure within the first end of the bore. The housing has a viewing port which allows exterior viewing of the longitudinal position of the plunger within the bore to determine corresponding fluid pressure. In a preferred embodiment the pressure gauge includes an over-pressure relief port in the cylinder wall located to release excess pressure when the plunger moves past the port. Preferably, the cylinder also includes a plug in one end, the spring means comprising a compression spring engageable at one end with the plug and at its other end with the plunger.

The fluid regulator includes a manifold block having an inlet and an outlet, valve means including a valve seat and a mating movable valve body for selectively releasing fluid from the inlet to the outlet, piston means movable in response to outlet fluid pressure for controlling the valve, and spring means for selectively urging the piston against fluid pressure, the piston means including vent means sealably engageable with the valve body so that when fluid pressure exceeds the spring means pressure, the piston moves away from the valve body, allowing fluid to escape until spring means pressure exceeds fluid pressure. In a preferred embodiment the valve means includes a ball and concave seat, and the vent means includes a hollow tube having first and second ends, the first end being in fluid communication with ambient air, and the second end sealingly engaging with the valve body, the tube being carried by the piston so that the tube dislodges the ball from the seat when spring means pressure on the piston exceeds fluid pressure.

BEST MODE FOR CARRYING OUT THE INVENTION

Figure 1:
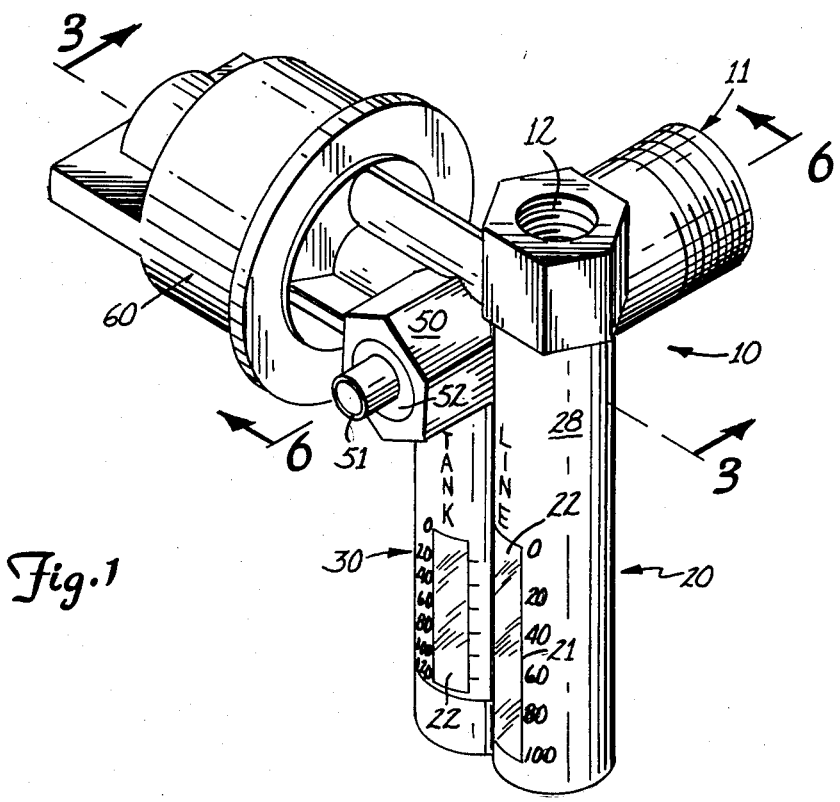
FIG. 1 is a perspective view of the pressure gauge and regulator of the invention.
Figure 2:
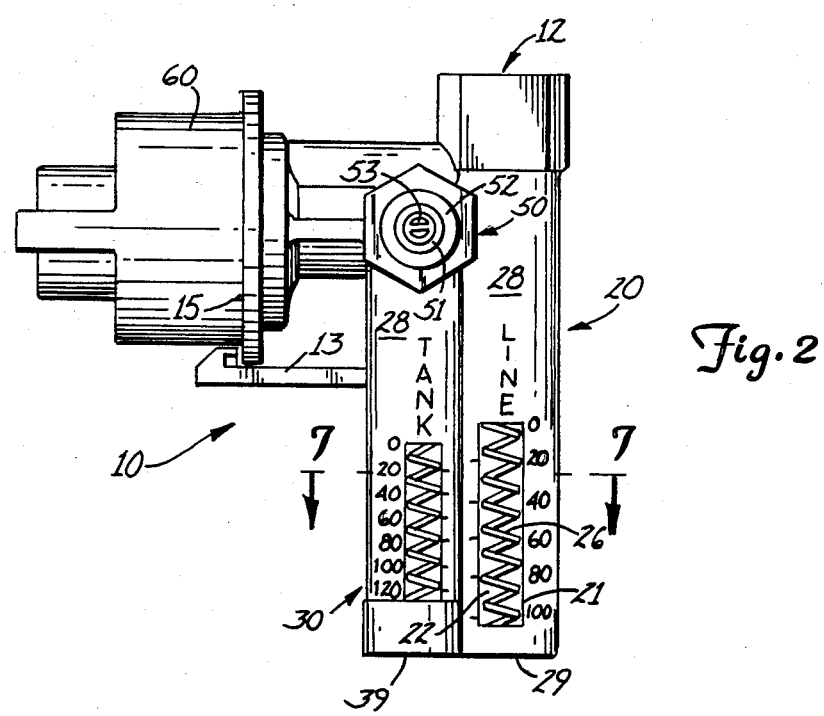
FIG. 2 is a front elevational view of the pressure gauge and regulator of the invention.

The pressure gauge and regulator of the invention may be adapted to a variety of uses in monitoring and controlling the flow of pressurized gases. The particular embodiment illustrated in the drawings is designed for use with a portable pressure tank which may be filled with compressed air from common air compressors such as those utilized at gas stations. The device may be adapted for use in a wide variety of applications, however, and it is understood that such uses are contemplated as within the scope of the invention.

Figure 3:
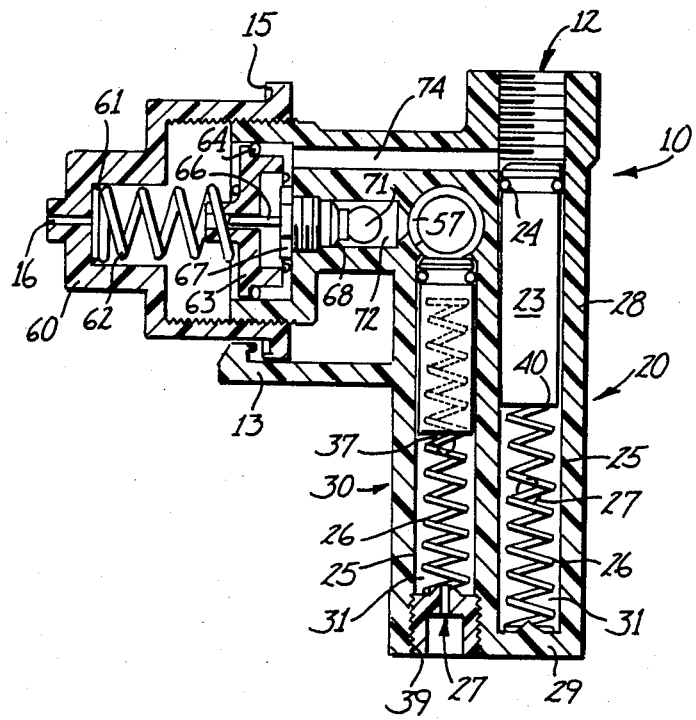
FIG. 3 is a cross-sectional elevation taken along line 3—3 of FIG. 1.
Figure 4:
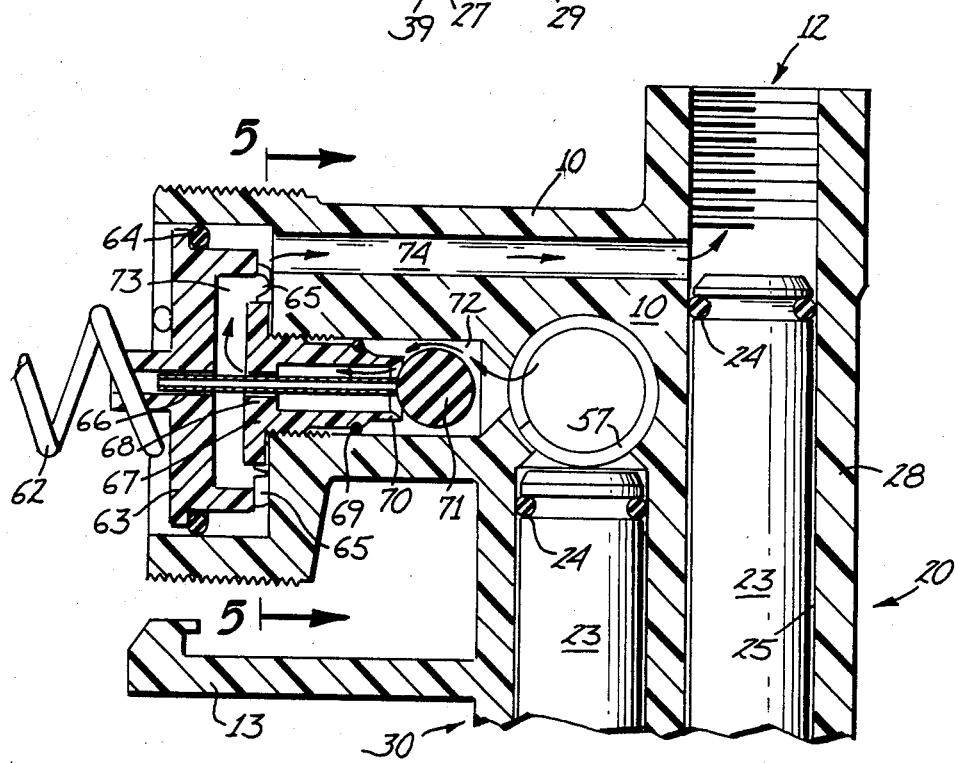
FIG. 4 is an enlarged and partially broken away view of FIG. 3.

Referring to FIGS. 1, 3 and 4, the pressure gauge and regulator of the invention includes a manifold block (10) having a number of generally perpendicular fluid passageways. The inlet (11) may be connected to a pressurized vessel or tank, or any other suitable compressed gas source, and the outlet (12) may be attached to a hose or line for directing the escaping gas to the appropriate task to be performed. The general internal fluid flow in a preferred embodiment is indicated in FIG. 4; from the inlet (11) fluid passes into the valve chamber (72), between the ball (71) and seat (70), through the center of the piston guide (67), into the piston chamber (73), back through the line passageway (74), exiting through the outlet (12).

A pair of pressure gauges (20) and (30) are in fluid communication with this fluid flow path. The tank gauge (30) is located on the tank side of the regulator valve to indicate tank pressure, and the line gauge (20) is located on the other side of the regulator valve to indicate line pressure.

Each gauge includes a cylinder (28) having a bore with an inner wall (25) within which is located a plunger (23) movable longitudinally with respect to the cylinder (28) in response to fluid pressure. The plunger (23) is loaded by a spring (26) which is preferably a compression spring captured between the plunger (23) and the end wall of the cylinder. Alternatively, these parts might be reversed and an expansion spring utilized. The plunger (23) is sealed against the cylinder wall surface (25) preferably by a resilient O-ring (24) or U-cup. The lower chamber (31) defined by the O-ring (24), the plunger (23), the cylinder wall (25), and the cylinder end wall (29) is vented to the environment through a vent hole (27). The vent hole (27) not only maintains ambient pressure in the lower chamber (31) but also prevents accumulation of moisture behind the plastic window (22). The O-ring (24) or U-cup also acts as a jam washer to prevent the plunger (23) from backing out of the cylinder (28).

Figure 7:
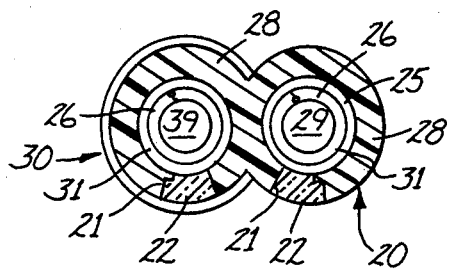
FIG. 7 is a cross-sectional view taken along line 7—7 of FIG. 2.

Applying the well-known principle that spring compression is directly proportional to the force exerted on the spring, it is evident that the location of the end of the plunger skirt (40) is directly related to fluid pressure. The device therefore includes a viewing port (21) in the cylinder wall (28) to allow visual inspection for the location of the end of the plunger skirt (40). A linear pressure scale or similar indicia located along the side of the viewing port (21) allows direct reading of fluid pressure. In a preferred embodiment the viewing port (21) is covered with a transparent material such as plastic to prevent foreign objects from fouling the device while facilitating convenient reading of the gauge. FIG. 7 shows a preferred configuration for this plastic window (22); by properly configuring the edges of the plastic window (22) no adhesive is required. Rather, the window (22) merely snaps into place.

Figure 8:
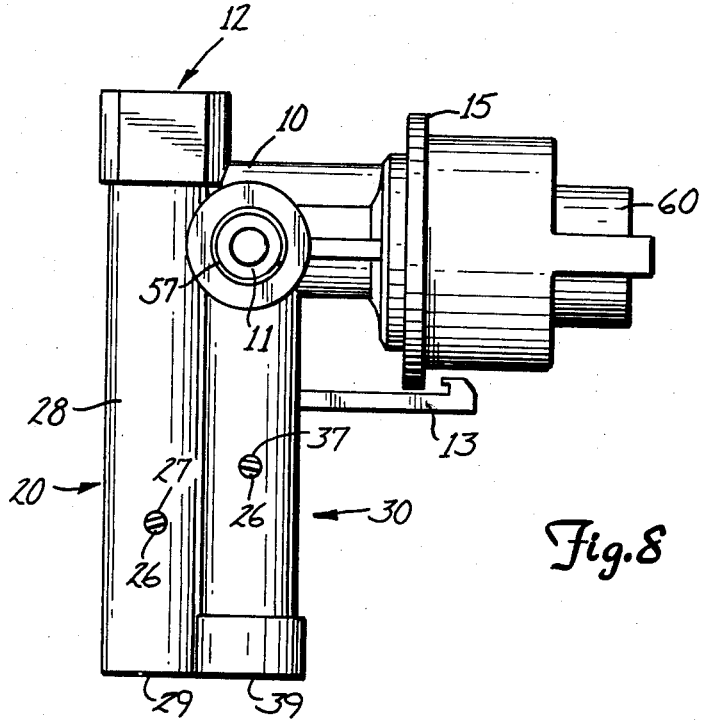
FIG. 8 is a rear elevational view of the pressure gauge and regulator of the invention.

In a preferred embodiment the tank gauge (30) contains a vent hole (37) strategically located to provide over-pressure relief. See FIGS. 3 and 8. In one embodiment this hole is located so that if tank pressure exceeds about 130 psi, the plunger (23) will be depressed sufficiently that the O-ring or U-cup slides past the vent hole (37), thereby venting excess pressure to the environment. This over-pressure relief mechanism has obvious advantages over prior mechanisms due to its simplicity and inherent reliability. The tank over-pressure relief hole (27) could be modified by locating a vent hole closer to the end plug (39) and utilizing one or more flutes in the cylinder wall (28) to provide over-pressure relief.

Figure 5:
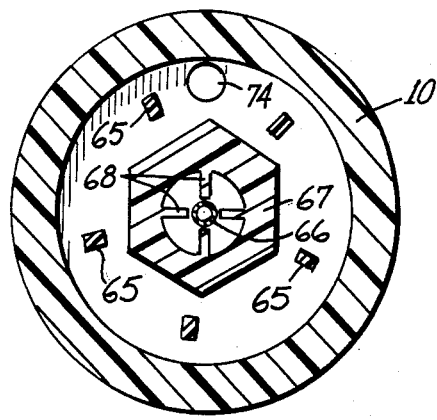
FIG. 5 is a cross-sectional view taken along line 5—5 of FIG. 4.

FIGS. 3-5 illustrate a preferred regulator valve which includes additional over-pressure protection. The valve itself is comprised of a movable valve body such as a ball (71) and a corresponding seat (70). Other configurations for the valve body and corresponding seat could also be utilized. In the preferred embodiment illustrated in FIGS. 3-5, the ball (71) need not be loaded by a spring because fluid flow through the valve chamber (72) automatically draws the ball (71) into its concave seat (70). A regulator piston (63) is urged toward the valve by a compression spring (62) and the control knob (60). A washer (61) facilitates rotation of the threaded knob (60) with respect to the compression spring (62).

As the knob (60) and compression spring (62) exert pressure against the regulator piston (63), this pressure is transmitted by the tube (66) to the ball (71), dislodging the ball (71) from its seat (70), permitting fluid flow through the valve. The piston preferably includes spacing knees (65) to assure adequate fluid flow between the piston (63) and the manifold block (10). The piston itself is sealed by an O-ring (64) or similar means against the manifold block (10). Piston guide (67) includes guide fingers (68) for guiding and centering the tube (66), assuring proper location and contact between tube (66) and the ball (71). The guide fingers (68) permit fluid flow between the tube (66) and piston guide (67).

It will now be understood that regulation of fluid flow is accomplished by rotating the knob clockwise to exert pressure on the piston (63), thereby dislodging the ball (71) from its seat (70). In this condition fluid will flow through the valve. When back pressure begins to build the line passageway (74) and the piston chamber (73), this pressure will eventually overcome the spring (62) pressure on the piston to withdraw the piston sufficiently to allow the ball (71) to contact the seat (70), preventing additional fluid flow.

If excess line pressure should develop, this pressure will cause the piston (63) to further retreat. When this occurs, the tube (66), which has been sealingly engaged with the surface of the ball (71), will break away from the ball (71), allowing fluid to enter the center of the vent tube (66), escaping to the environment through the knob vent hole (16). Because this over-pressure relief mechanism is inherently dependent upon the pressure exerted by spring (62) against the piston (63), the over-pressure relief setting can be adjusted as desired by turning the knob (60). To prevent the knob from being inadvertently removed, the manifold block (10) includes a knob retainer (13) which has a lip for engagement with a complementary annular lip (15) on the knob (60).

Figure 6:
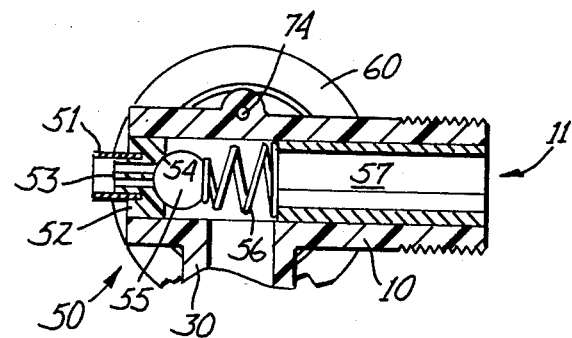
FIG. 6 is a partially broken away cross-section taken along line 6—6 of FIG. 1.

The preferred embodiment illustrated in the drawings is adapted to be attached to a portable pressure tank which may be filled with compressed air at a gas station or from a conventional compressor. For purposes of filling the tank, a filler check valve (50) is provided (see FIG. 6). This mechanism preferably includes a metal collar (51) sized to be received in the chuck of a conventional compressed air hose. The filler valve core (52) includes a center strap (53) to activate the pin of the chuck. A ball (55) and concave valve seat (54) are provided, the ball (55) being urged against its seat (54) by a compression spring (56). The spring (56) in turn is held in place by a roll pin (57).

Operation of the pressure gauge and regulator is relatively straightforward. If used on a portable pressure vessel, the tank may be filled through the filler check valve (50) using conventional compressed air supply equipment. The tank pressure gauge will automatically register fluid pressure within the tank. Fluid may be released to the line by turning the knob (60) clockwise, causing the piston (63) to unseat the ball (71). As fluid flows past the valve, pressure may build in the line until it is sufficient to equal the pressure exerted by the compression spring (62), at which time the piston (63) will retreat, allowing the ball (71) to again seat. Line pressure will be indicated by the line pressure gauge (20). If back pressure or over-pressure develops in the line, it will cause the piston (63) to retreat even further, breaking the seal between the vent tube (66) and the ball (71) and allowing the excess air to escape to the environment. If excess pressure develops in the tank, the tank gauge plunger (23) will be depressed far enough to allow excess pressure to vent to the environment through the tank gauge vent hole (27).

Construction of the device is similarly straightforward. The manifold block (10) may be manufactured by well-known injection molding techniques from suitable plastics or similar materials. The respective parts to be assembled on the manifold block (10) similarly may be injection molded. As indicated in the drawings, many of the parts are assembled by cutting or molding complementary threads. Alternately, parts may be ultrasonically welded; for example, filler valve core (52) is ultrasonically welded to the manifold block (10) in a preferred embodiment. Although conventional lubricated O-rings may be used to seal the plungers to the cylinder wall, in a preferred embodiment low-friction U-cup seals are employed; these seals desireably are impregnated with teflon. Regulator valve ball (71) desireably is made of a suitable rubber; one embodiment uses a ball having a durometer hardness of about 70.

While a preferred embodiment of the presemt invention has been described, it should be understood that various changes, adaptations and modifications may be made therein without departing from the spirit of the invention and the scope of the appended claims.

What is claimed is:

1. A fluid pressure gauge comprising a housing having a longitudinal bore; a plunger slideably received in the bore and sealingly engaging walls of the bore; inlet port means for supplying a fluid under pressure to a first end of the bore; and spring means carried within the bore and biasing the plunger toward said first end thereof, the spring means having a spring constant linearly relating longitudinal movement of the plunger to fluid pressure within the first end of the bore; the housing having a viewing port enabling exterior viewing of the longitudinal position of the plunger within the bore, and an over-pressure relief port in the wall of the bore located to release excess pressure when the plunger moves past the port.

2. The pressure gauge of claim 1 including exteriorly visible indicia relating the observed longitudinal position of the plunger to fluid pressure in the first end of the bore.

3. The pressure gauge of claim 1 wherein the relief port is an aperture in the cylinder wall.

4. The pressure gauge of claim 1 wherein the relief port is a flute in the cylinder wall.

5. The pressure gauge of claim 1 wherein said bore includes a spring seat in its other end, the compression spring means comprising a compression spring seated between the spring seat and the plunger.

6. The pressure gauge of claim 5 wherein the plunger includes a resilient, circumferential ring sealingly engaging walls of the cylinder wall.

7. The pressure gauge of claim 5 wherein the plunger includes a generally cylindrical skirt extending longitudinally toward the other end of the cylinder, terminating in an end which is visible through the viewing port for determination of the plunger location and corresponding fluid pressure.

8. A fluid pressure gauge apparatus comprising first and second pressure gauges and valve means in fluid communication with and separating said two pressure gauges for controlling fluid flow, each of said pressure gauges including a housing having a longitudinal bore, a plunger slideably received in the bore and sealingly engaging walls of the bore, inlet port means for supplying a fluid under pressure to a first end of the bore, and spring means carried within the bore and biasing the plunger toward said first end thereof, the spring means having a spring constant linearly relating longitudinal movement of the plunger to fluid pressure within the first end of the bore, the housing having a viewing port enabling exterior viewing of the longitudinal position of the plunger within the bore.

9. The pressure gauge apparatus of claim 8 further including:
a manifold block including an inlet in fluid communication with said first pressure gauge and an outlet in fluid communication with said second pressure gauge, said valve means selectively releasing fluid from the inlet to the outlet and including a valve seat and a mating movable valve body,
piston means movable in response to outlet fluid pressure for controlling the valve, and
spring means for selectively urging the piston against outlet fluid pressure,
the piston means including vent means sealed by the valve body but disengageable therefrom so that when fluid pressure exceeds the spring means pressure the piston and vent means move away from the valve body, breaking said seal and allowing fluid to escape through the vent means until spring means pressure again exceeds fluid pressure.

10. The pressure gauge apparatus of claim 9 wherein the valve means comprises a ball and concave seat.

11. The pressure gauge apparatus of claim 9 wherein the vent means includes a hollow tube having first and second ends, the first end being in fluid communication with the environment, and the second end sealingly engaging the valve body, the tube being carried by the piston so that the tube dislodges the valve body from the seat when spring means pressure on the piston exceeds fluid pressure.

12. A fluid pressure gauge and regulator comprising:
a manifold block having a longitudinal bore, inlet port means for supplying a fluid under pressure to a first end of the bore, and an outlet;
a plunger slidably received in the bore and sealingly engaging walls of the bore;
compression spring means carried within the bore and biasing the plunger toward said first end thereof, the spring means having a spring constant linearly relating longitudinal movement of the plunger to fluid pressure within the first end of the bore, the manifold block having a viewing port enabling exterior viewing of the longitudinal position of the plunger within the bore;
valve means including a valve seat and a mating movable valve body for selectively releasing fluid from the inlet port means to the outlet;
piston means movable in response to outlet fluid pressure for controlling the valve;
spring means for selectively urging the piston against outlet fluid pressure;
the piston means including vent means sealed by the valve body but disengageable therefrom so that when fluid pressure exceeds the spring means pressure the piston and vent means move away from the valve body, breaking said seal and allowing fluid to escape through the vent means until spring means pressure again exceeds fluid pressure.

13. The pressure gauge and regulator of claim 12 wherein the manifold block includes an overpressure relief port in the wall of the bore located to release excess pressure when the plunger moves past the relief port.

14. The pressure gauge and regulator of claim 12 wherein the bore includes a spring seat in its other end, the compression spring means comprising a compression spring seated between the spring seat and the plunger.

15. The pressure gauge and regulator of claim 12 wherein the vent means includes a hollow tube having first and second ends, the first end being in fluid communication with the environment, and the second end sealingly engaging the valve body, the tube being carried by the piston so that the tube dislodges the valve body from the seat when spring means pressure on the piston exceeds fluid pressure.

* * * * *